(12) United States Patent
Nomura

(10) Patent No.: US 10,764,405 B2
(45) Date of Patent: Sep. 1, 2020

(54) COMMUNICATION SYSTEM

(71) Applicant: NEC Corporation, Minato-ku, Tokyo (JP)

(72) Inventor: Junichi Nomura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 325 days.

(21) Appl. No.: 15/895,085

(22) Filed: Feb. 13, 2018

(65) Prior Publication Data

US 2018/0288195 A1 Oct. 4, 2018

(30) Foreign Application Priority Data

Mar. 30, 2017 (JP) .................................. 2017-067163

(51) Int. Cl.
*H04L 29/06* (2006.01)
*H04L 12/24* (2006.01)

(52) U.S. Cl.
CPC .......... *H04L 69/04* (2013.01); *H04L 41/0806* (2013.01)

(58) Field of Classification Search
CPC ...................................................... H04L 69/04
See application file for complete search history.

(56) References Cited

U.S. PATENT DOCUMENTS

| 2005/0041660 | A1* | 2/2005 | Pennec .................. H04L 69/04 370/389 |
| 2011/0090889 | A1* | 4/2011 | Yamada .............. H04L 61/2015 370/338 |
| 2012/0170571 | A1* | 7/2012 | Antonelli ................ H04L 69/04 370/352 |
| 2014/0317137 | A1 | 10/2014 | Hanaoka et al. |
| 2016/0301763 | A1* | 10/2016 | Luo ........................ H04L 29/06 |

FOREIGN PATENT DOCUMENTS

| JP | 2006-287518 A | 10/2006 |
| JP | 2011-128915 A | 6/2011 |
| WO | 2013/136418 A1 | 9/2013 |

OTHER PUBLICATIONS

Japanese Office Action for JP Application No. 2017-067163 dated May 29, 2018 with English Translation.

* cited by examiner

*Primary Examiner* — Kodzovi Acolatse
*Assistant Examiner* — Abdeltif Ajid

(57) ABSTRACT

A communication system includes transmitters and a receiver. The receiver includes a template extractor configured to extract a template consisting of a common portion and a variable portion of transmission data received from the transmitters on the basis of transmitter identification information included in the transmission data and content of the transmission data and a template transmitter configured to transmit the extracted template to the transmitters. The transmitters each include a transmission unit that compresses the transmission data using the template and transmits the compressed transmission data to the receiver.

17 Claims, 6 Drawing Sheets

COMMUNICATION SYSTEM

INCORPORATION BY REFERENCE

The present invention is based upon and claims the benefit of priority from Japanese patent application No. 2017-067163, filed on Mar. 30, 2017, the disclosure of which is incorporated herein in its entirety by reference.

TECHNICAL FIELD

The present invention relates to a communication system.

BACKGROUND ART

Data is typically represented by character strings in order to increase the readability or transferability. However, the use of character strings may consume the network bandwidth or disk capacity in an environment including many transmitters. For this reason, data has to be compressed before transmitted or received.

Patent Document 1 discloses a technology that compiles character strings included in data received from each transmitter to generate a compression rule and transmits the generated compression rule along with a receipt notification to the transmitter.

Patent Document 1: Japanese Unexamined Patent Application Publication No. 2006-287518

SUMMARY OF THE INVENTION

On the other hand, an indefinite number of various transmission devices or transmission software applications exist in an environment such as cloud computing or Internet of things (IoT) in recent years. For this reason, it is difficult to prepare a dictionary for compression in advance and to share it. Also, even if compression rules are dynamically generated as in Patent Document 1, those rules are not versatile, since the compression rules correspond to the respective transmitters. Accordingly, it is difficult to efficiently transmit and receive data in a communication system including multiple transmitters.

Accordingly, an object of the present invention is to resolve the difficulty in efficiently transmitting and receiving data in a communication system including multiple transmitters.

A communication system according to one aspect of the present invention includes: transmitters; and a receiver.

The receiver includes:

a template extractor configured to extract a template consisting of a common portion and a variable portion of transmission data received from the transmitters on the basis of transmitter identification information included in the transmission data and content of the transmission data; and a template transmitter configured to transmit the extracted template to the transmitters.

The transmitters each include a transmission unit configured to compress the corresponding transmission data using the template and to transmit the compressed transmission data to the receiver.

A receiver according to one aspect of the present invention includes:

a template extractor configured to extract a template consisting of a common portion and a variable portion of transmission data received from transmitters on the basis of transmitter identification information included in the transmission data and content of the transmission data; and a template transmitter configured to transmit the extracted template to the transmitters.

A program according to one aspect of the present invention causes a receiver to implement:

a template extractor configured to extract a template consisting of a common portion and a variable portion of transmission data received from transmitters on the basis of transmitter identification information included in the transmission data and content of the transmission data; and a template transmitter configured to transmit the extracted template to the transmitters.

A transmitter according to one aspect of the present invention includes a transmission unit configured to compress transmission data using a template extracted and transmitted by a receiver on the basis of transmitter identification information included in the transmission data received from the transmitter and content of the transmission data and consisting of a common portion and a variable portion of the transmission data and to transmit the compressed transmission data to the receiver.

A program according to one aspect of the present invention causes a transmitter to implement a transmission unit configured to compress transmission data using a template extracted and transmitted by a receiver on the basis of transmitter identification information included in the transmission data received from the transmitter and content of the transmission data and consisting of a common portion and a variable portion of the transmission data and to transmit the compressed transmission data to the receiver.

A communication method according to one aspect of the present invention is a communication method performed by a communication system including transmitters and a receiver.

The communication method includes:

extracting, by the receiver, a template consisting of a common portion and a variable portion of transmission data received from the transmitters on the basis of transmitter identification information included in the transmission data and content of the transmission data and transmitting the extracted template to the transmitters; and compressing, by the transmitters, the transmission data using the template and transmitting the compressed transmission data to the receiver.

According to the aspects of the present invention, data can be transmitted and received efficiently in the communication system including the multiple transmitters.

EXEMPLARY EMBODIMENT

First Embodiment

Figure 1:
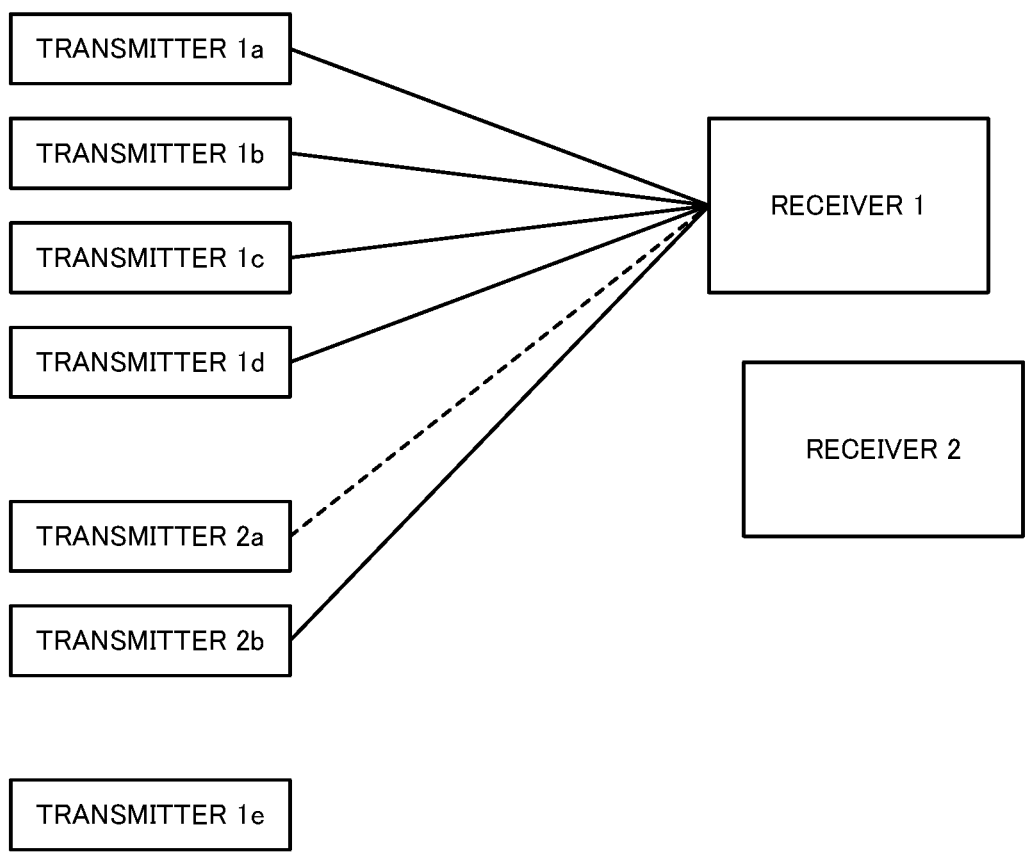
FIG. 1 is a block diagram showing the overall configuration of a communication system according to a first embodiment of the present invention.
Figure 2:
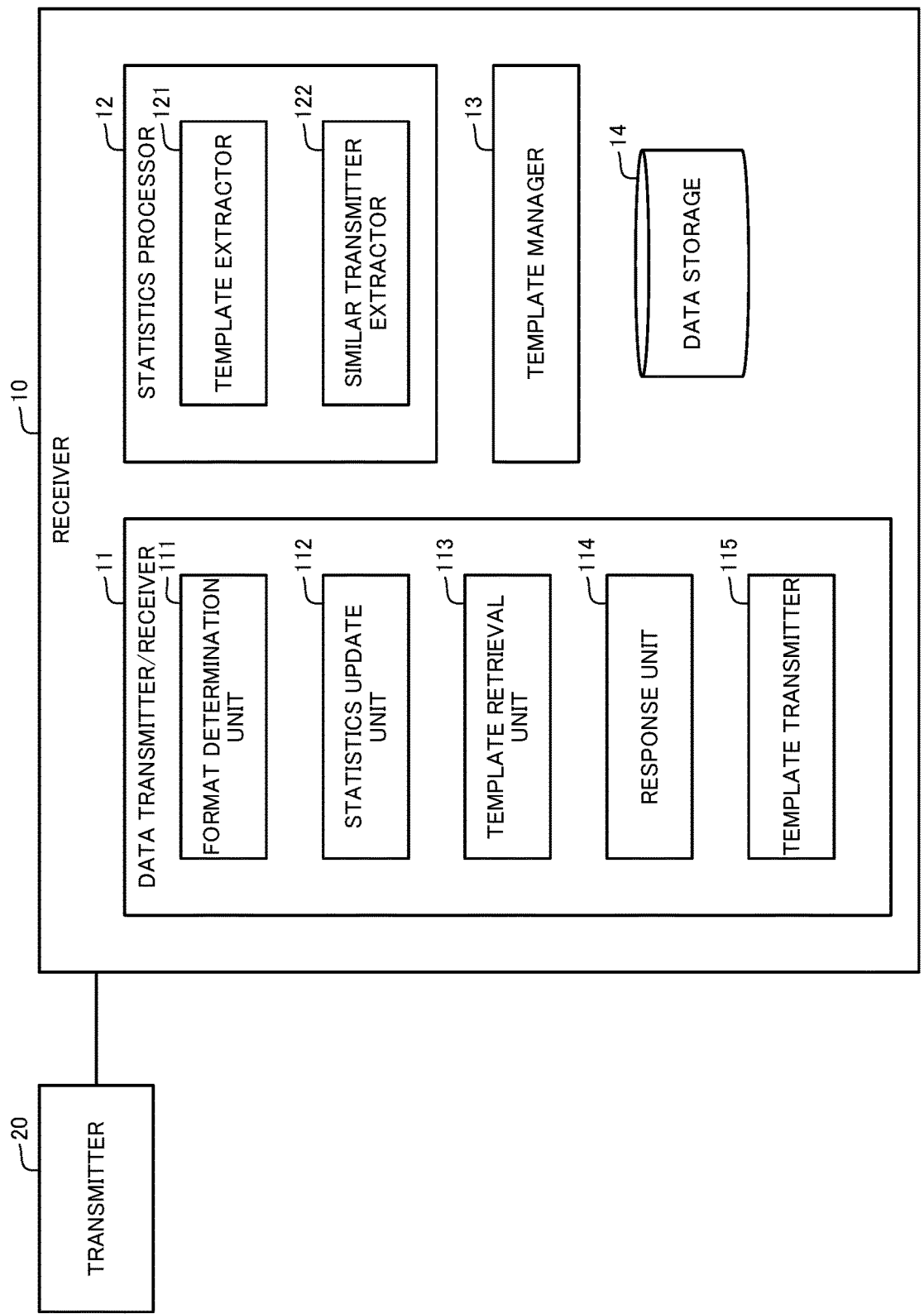
FIG. 2 is a block diagram showing the configuration of a receiver shown in FIG. 1.
Figure 3:
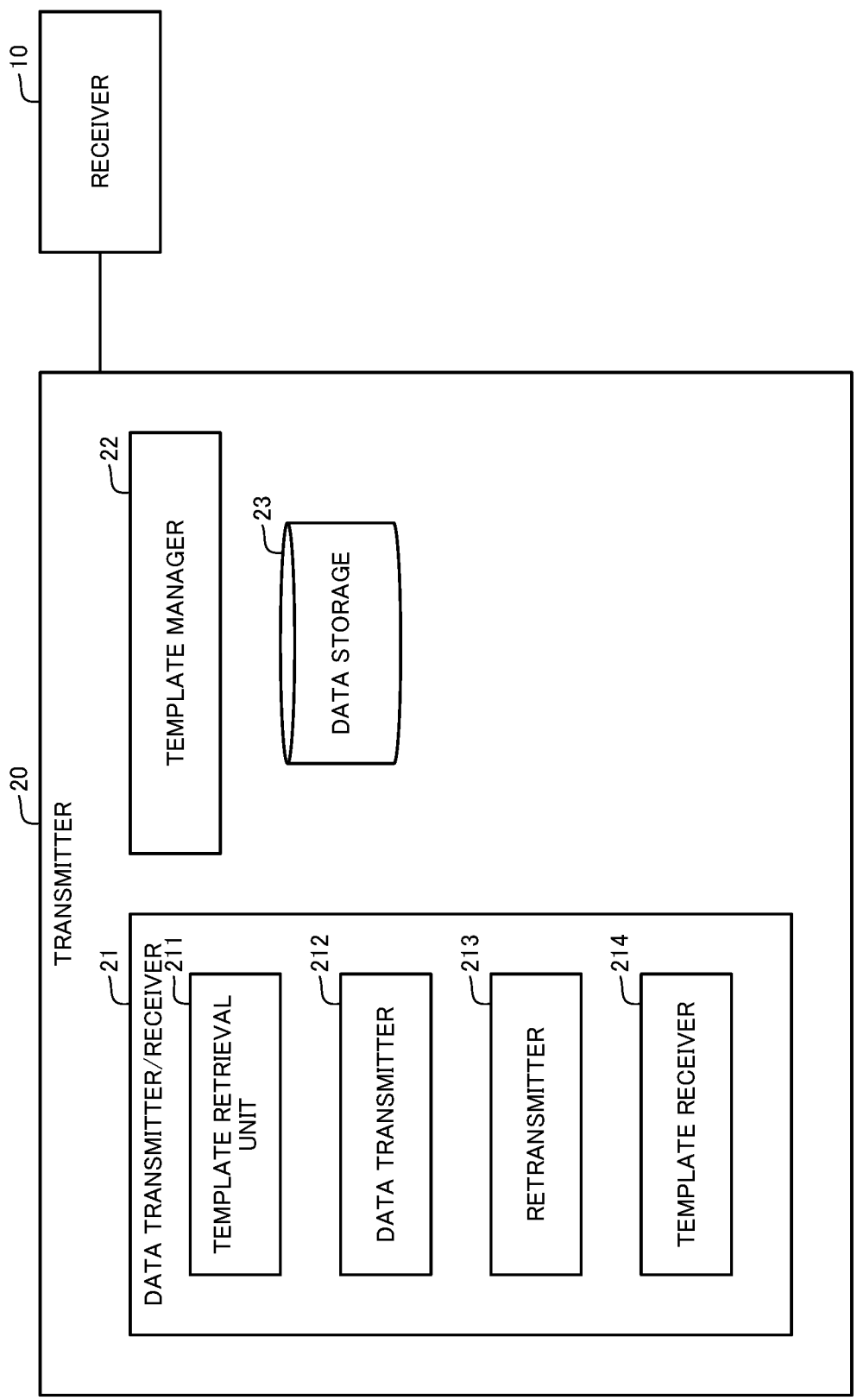
FIG. 3 is a block diagram showing the configuration of a transmitter shown in FIG. 1.
Figure 4:
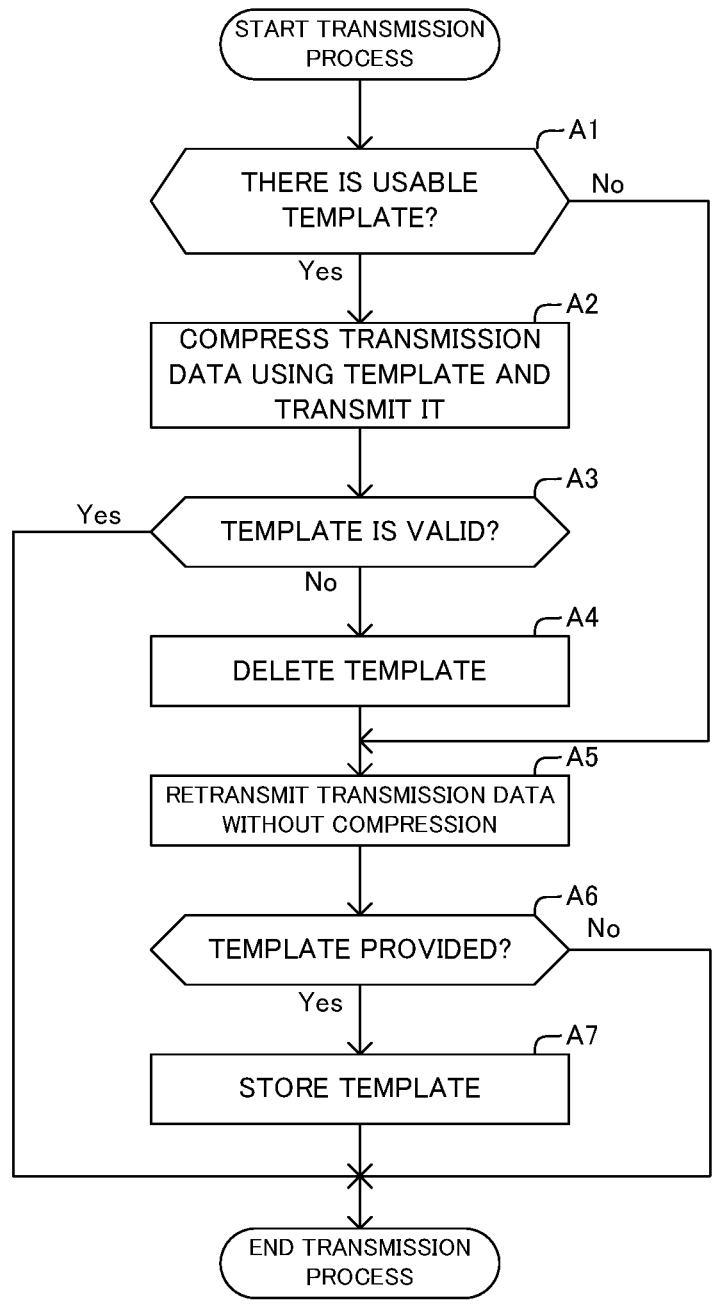
FIG. 4 is a flowchart showing a transmission process performed by the communication system shown in FIG. 1.
Figure 5:
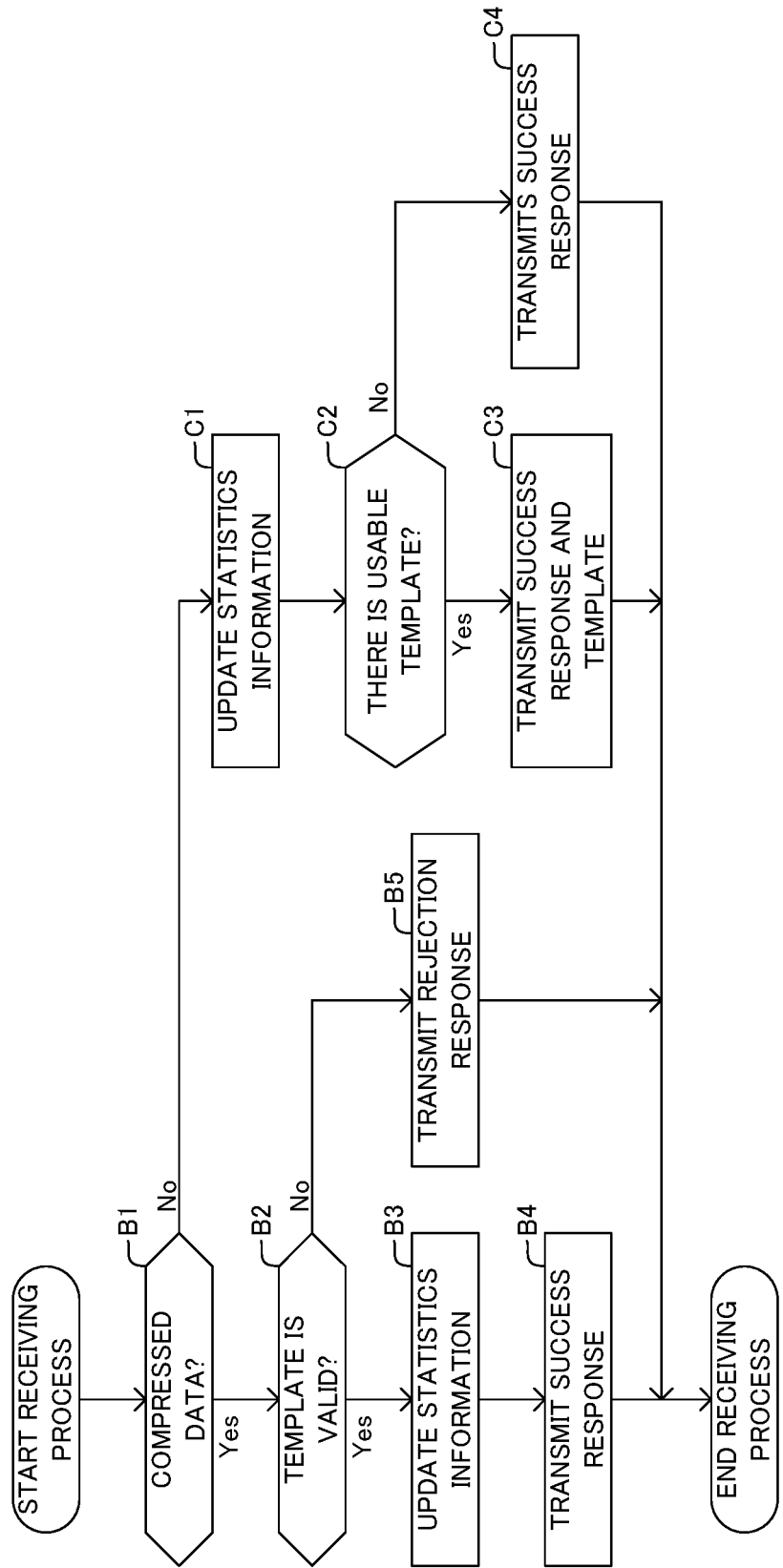
FIG. 5 is a flowchart showing a receiving process performed by the communication system shown in FIG. 1.
Figure 6:
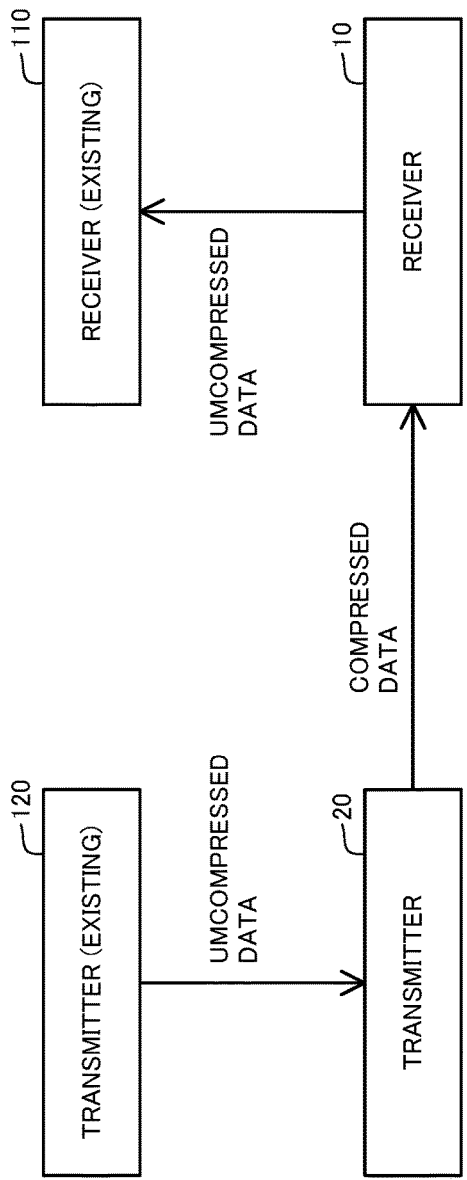
FIG. 6 is a diagram showing an example application of the communication system according to the first embodiment of the present invention.

A communication system according to a first embodiment of the present invention will be described with reference to FIGS. 1 to 6. FIGS. 1 to 3 are diagrams showing the configuration of the communication system according to the present embodiment; FIGS. 4 and 5 are flowcharts showing the operation of the communication system according to the present embodiment; and FIG. 6 is a diagram showing an example application of the communication system of the present embodiment.
Configuration A communication system according to the present invention includes transmitters and a receiver, and transmission data transmitted from the transmitters is received by the receiver. As shown in FIG. 1, the communication system according to the present embodiment includes multiple transmitters, including transmitters 1a to 1d, and a receiver 1, and the transmitters are connected to the receiver 1 so as to transmit transmission data thereto.

A transmitter group including the transmitters 1a to 1d and a transmitter group including transmitters 2a, 2b are, for example, groups of transmitters that transmit transmission data having similar content. For example, compared to typical character strings, character strings representing data such as event log and sensor information are characterized in that portions other than some variable portions such as numerical representation, time representation, and identification information have the repeated same pattern. Pieces of transmission data transmitted from devices of the same model or software applications whose versions do not differ much are characterized to often have a common pattern. The above transmitter groups are groups of transmitters that transmit pieces of transmission data having the repeated same pattern or a common pattern as described above.

The present invention allows transmitter groups as described above to effectively compress transmission data and then transmit the compressed transmission data even if the transmitter groups are present in an environment in which no compression dictionary is provided in advance and transmission data varies when necessary.

In the communication system shown in FIG. 1, for example, a transmitter such as the transmitter 2a disappears with time, and a transmitter such as a transmitter 1e appears newly. As for the receiver, the receiver 1 may be stopped and replaced by a receiver 2 depending on the situation.

Now, the configuration of the receiver 10 and transmitters 20 described above will be described with reference to FIGS. 2 and 3.

The receiver 10 is an information processor including an arithmetic device and a storage device. As shown in FIG. 2, the receiver 10 includes a data transmitter/receiver 11, a statistics processor 12, and a template manager 13 implemented by causing the arithmetic device to execute a program. The storage device includes a data storage 14.

The data transmitter/receiver 11 receives pieces of transmission data from the transmitters 20 and makes responses thereto. The data transmitter/receiver 11 includes a format determination unit 111, a statistics update unit 112, a template retrieval unit 113, a response unit 114, and a template transmitter 115.

The format determination unit 111 determines whether transmission data received from a transmitter 20 is data compressed using a template. If the transmission data is data compressed using a template, the format determination unit 111 passes the transmission data to the template retrieval unit 113; if not, it passes the transmission data to the statistics update unit 112.

The statistics update unit 112 provides the transmission data to the statistics processor 12 so that statistics information is updated using the uncompressed transmission data. As will be described later, if the transmission data is data compressed using a template and the template is valid, the statistics update unit 112 provides the transmission data to the statistics processor 12.

The template retrieval unit 113 (response unit) determines the validity of the template used to compress the received transmission data by inquiring of the template manager 13. If the template used to compress the transmission data is stored in the data storage 14 under the management of the template manager 13, the template retrieval unit 113 determines that the template is valid; if not, it determines that the template is invalid.

For example, if the identifier of the template included in the transmission data and used to compress the transmission data is stored in the data storage 14, the template retrieval unit 113 determines that the template is valid. The template retrieval unit 113 then notifies the response unit 114 and statistics processor 12 that the template is valid. On the other hand, if the identifier of the template included in the transmission data is not stored in the data storage 14, the template retrieval unit 113 determines that the template is invalid and notifies the response unit 114 that the template is invalid.

The response unit 114 (response unit) transmits a response to the transmitter 20, which has transmitted the received transmission data. For example, if the template retrieval unit 113 determines that the template used to compress the transmission data is valid, the response unit 114 transmits a response indicating that the transmission data has been successfully transmitted, to the transmitter 20. On the other hand, if the template is invalid, the response unit 114 notifies the transmitter 20 that the template is invalid and the transmission data has been rejected, as well as requests the transmitter 20 to retransmit the transmission data.

As will be described later, the template transmitter 115 transmits, to the transmitter 20, information about the template extracted from the transmission data received by the statistics processor 12. Also, as will be described later, the template transmitter 115 transmits the same template to transmitters 20 selected by a similar transmitter extractor 122 of the statistics processor 12.

The statistics processor 12 collects and manages statistics information about pieces of transmission data transmitted from the multiple transmitters 20. The statistics processor 12 includes a template extractor 121 and the similar transmitter extractor 122. For example, the statistics processor 12 previously stores, in the data storage 14, transmission data received from the statistics update unit 112 and not compressed using a template and templates extracted as described below and extracts a template using such information.

The template extractor 121 (template extractor) extracts a template consisting of a common portion and a variable portion of multiple pieces of transmission data received from the transmitters 20 on the basis of transmitter identifiers (pieces of transmitter identification information) included the pieces of transmission data and the content of the pieces of transmission data. For example, at the timing when the it receives uncompressed transmission data from a transmitter 20, the template extractor 121 extracts a template from the received transmission data and pieces of transmission data stored in the data storage 14 and received in the past.

Specifically, the template extractor 121 extracts, from the pieces of transmission data, a template having a data structure consisting of a common portion which is a frequently occurring data portion and a variable portion which is the other data portion. For example, a transmitter identifier included in transmission data can be a variable portion. The template extractor 121 then provides a template identifier to the extracted template and stores the template in the data storage 14 through the template manager 13 in such a manner that the template identifier and the data structure of the template are associated with each other.

The transmitter identifiers included in the pieces of transmission data are, for example, pieces of identification information, such as IP addresses or MAC addresses, that identify the transmitters 20, or pieces of identification information that identify software applications installed in the transmitters 20. However, the transmitter identifiers are not limited to the above information.

The similar transmitter extractor 122 determines the patterns of the pieces of transmission data, that is, determines whether there are templates similar to the extracted template and then extracts the transmitter identifiers of transmitters 20 that have transmitted pieces of transmission data from which the similar templates have been extracted. For example, the similar transmitter extractor 122 determines that templates whose common portions completely match that of the extracted template or templates whose common portions partially match that of the extracted template are similar templates. The similar transmitter extractor 122 then selects the transmitters 20 that have transmitted pieces of transmission data from which the similar templates have been extracted and transmits the same template to the selected transmitters 20 through the template transmitter 115. At this time, if the similar templates have different data structures, the similar transmitter extractor 122 transmits one of the similar templates as the same template, or generates one new template having a data portion common to the similar templates as a common portion and transmits the new template as the same template.

The template manager 13 stores the template extracted by the statistics processor 12 in the data storage 14. The template manager 13 also checks templates used in pieces of transmission data and deletes less frequently used templates from the data storage 14. The use frequency of a template is, for example, the total number of times of use thereof or the number of times of use thereof in a predetermined period. If the use frequency of the template falls below a predetermined threshold, the template manager 13 determines that the template is a less frequently used template.

Next, the configuration of a transmitter 20 will be described. A transmitter 20 is an information processor including an arithmetic device and a storage device. As shown in FIG. 3, the transmitter 20 includes a data transmitter/receiver 21 and a template manager 22 implemented by causing the arithmetic device to execute a program. The storage device includes a data storage 23.

The data transmitter/receiver 21 (transmission unit) transmits transmission data to the receiver 10 and receives a response from the receiver 10. The data transmitter/receiver 21 includes a template retrieval unit 211, a data transmitter 212, a retransmitter 213, and a template receiver 214.

The template retrieval unit 211 retrieves a template usable to compress transmission data to be transmitted. For example, as will be described later, the template retrieval unit 211 checks the data structures of templates stored in the data storage 23 and retrieves a template corresponding to the data structure of the transmission data.

The data transmitter 212 then compresses the transmission data using the retrieved template and transmits the compressed transmission data to the receiver 10. For example, the data transmitter 212 transmits the transmission data in a format consisting of the identifier of the retrieved template and a parameter corresponding to a variable portion to the receiver 10. If the template retrieval unit 211 fails to retrieve a template usable to compress the transmission data, the data transmitter 212 transmits the transmission data to the receiver 10 as it is without compressing it.

If the retransmitter 213 receives a response indicating that the template is invalid and the transmission data has been rejected, from the receiver 10 with respect to the transmission data compressed using the template and then transmitted, it retransmits the transmission data. At this time, the retransmitter 213 transmits the transmission data to the receiver 10 as it is without using a template, that is, without compressing the transmission data. The retransmitter 213 also deletes the template whose invalidity the retransmitter 213 has been notified of by the receiver 10, from the data storage 23 through the template manager 22.

The template receiver 214 receives a template extracted from transmission data and then transmitted by the receiver 10 and stores it in the data storage 23 through the template manager 22. For example, the template receiver 214 stores the template in the data storage 23 in such a manner that the identifier and data structure of the template are associated with each other.

The template manager 22 stores a template received by the template receiver 214 in the data storage 23. The template manager 22 also discards a template to which a rejection response has been received, or a less frequently used template. The use frequency of a template is, for example, the total number of times of use thereof, or the number of times of use thereof in a predetermined period. If the use frequency of the template falls below a predetermined threshold, the template manager 22 determines that the template is a less frequently used template.

Operation

Next, the operation of the communication system will be described with reference to flowcharts of FIGS. 4 and 5. First, referring to FIG. 4, the operation of a transmitter 20 will be described.

The template retrieval unit 211 of the transmitter 20 checks whether there is a template usable to compress transmission data to be transmitted (step A1). For example, the template retrieval unit 211 checks the data structures of templates stored in the data storage 23 and determines whether there is a template corresponding to the data structure of the transmission data among the templates.

If there is a template usable to compress the transmission data (Yes in step A1), the data transmitter 212 of the transmitter 20 compresses the transmission data using the template and transmits the compressed transmission data to the receiver 10 (step A2). At this time, the data transmitter 212 transmits the transmission data to the receiver 10, for example, in a format consisting of the identifier of the retrieved template and a parameter corresponding to a variable portion.

If there is no template usable to compress the transmission data (No in step A1), the data transmitter 212 transmits the transmission data to the receiver 10 as it is without using a template, that is, without compressing the transmission data (step A5).

The transmitter 20 receives a response to the transmission data transmitted using the template, from the receiver 10 and determines whether the template is valid, on the basis of the response (step A3). Specifically, if the transmitter 20 receives a response indicating that the transmission data has been transmitted successfully, from the receiver 10, it determines that the template is valid (Yes in step A3), ending the transmission process; if the transmitter 20 receives a response requesting the transmitter 20 to retransmit the transmission data, from the receiver 10, it determines that the template is not valid (No in step A3). In the latter case, the retransmitter 213 deletes this template from the data storage 23 through the template manager 22 (step A4) and then retransmits the transmission data that has not been transmitted successfully, as it is without using a template, that is, without compressing the transmission data (step A5).

The transmitter 20 then receives a response to the transmission data transmitted without using a template and checks whether a template has been provided from the receiver 10, on the basis of the response (step A6). If a template has been provided (Yes in step A6), the template receiver 214 receives the template, and the template manager 22 stores the template in the data storage 23 (step A7), ending the transmission process.

Next, referring to FIG. 5, the operation of the receiver 10 will be described. When the receiver 10 receives transmission data from a transmitter 20, the format determination unit 111 determines whether the transmission data is transmission data compressed using a template (step B1).

If the transmission data is not transmission data compressed using a template (No in step B1), the statistics processor 12 stores the received transmission data in the data storage 14 and updates statistics information (step C1). The template extractor 121 then checks whether there is a template usable to compress the received transmission data. Specifically, the template extractor 121 checks whether there is such a template among templates stored in the data storage 14. If not, the template extractor 121 checks whether a new template can be generated from the received transmission data and the past transmission data.

If there is a template usable to compress the transmission data (Yes in step C2), the response unit 114 of the receiver 10 transmits a response indicating that the transmission data has been transmitted successfully, to the transmitter 20 that has transmitted the transmission data, and the template transmitter 115 of the receiver 10 transmits that template to the transmitter 20 (step C3). At this time, the template extractor 121 extracts such a template from the data storage 14. If there is no such template in the data storage 14 and a new template is generated, the template extractor 121 stores the new template in the data storage 14 under the management of the template manager 13. The similar transmitter extractor 122 of the receiver 10 then selects other transmitters 20 to which the template can be applied. Specifically, the similar transmitter extractor 122 selects the identifiers of transmitters 20 storing templates similar to the extracted template. The receiver 10 then transmits the extracted template also to the transmitters 20 having the identifiers.

If there is no template usable to compress the received transmission data (No in step C2), the response unit 114 of the receiver 10 simply transmits a response indicating that the transmission data has been transmitted successfully (step C4).

If the received transmission data is transmission data compressed using a template (Yes in step B1), the receiver 10 determines the validity of the template (step B2). Specifically, the template retrieval unit 113 checks whether the template used to compress the transmission data is stored in the data storage 14 under the management of the template manager 13.

If the template used to compress the transmission data is determined to be stored in the data storage 14 and to be valid (Yes in step B2), the statistics update unit 112 updates the statistics information (step B3). The response unit 114 transmits a response indicating that the transmission data has been transmitted successfully, to the transmitter 20 (step B4). On the other hand, if the template used to compress the transmission data is determined not to be stored in the data storage 14 and to be invalid, the response unit 114 transmits a response indicating that the transmission data has been rejected, to the transmitter 20 (step B5).

As seen above, in the communication system according to the present embodiment, the receiver 10 receives pieces of transmission data from the multiple transmitter 20, extracts a template from the pieces of transmission data, and transmits the template to the transmitters 20, and the transmitters 20 compress the pieces of transmission data using the template and transmit the compressed pieces of transmission data to the receiver 10. Thus, data can be transmitted and received efficiently in the communication system including the multiple transmitters.

Also, the receiver 10 is able to select transmitters to which the template will be provided, on the basis of statistics information. Thus, the effect of compressing the transmission data using the template can be extended to other transmitters 20.

Also, the receiver and transmitters manage templates on the basis of the use frequencies thereof, that is, discard less frequently used templates. If a transmitter compresses transmission data using an unknown template and then transmits it, the transmitter deletes the template and retransmits the transmission data without compressing it. Thus, even if the communication system includes an indefinite number of transmitters, it is able to update the content of the template dictionary so as to follow changes in such transmitters. As a result, the communication system is able to cope with the appearance, disappearance, and change of the transmitters and receiver.

As shown in FIG. 6, the receiver 10 and a transmitter 20 according to the present embodiment may be disposed between an existing receiver 110 and transmitter 120 on the communication path. Thus, while the existing devices transmit or receive data in an uncompressed manner, the transmitter and receiver according to the present embodiment are able to compress and then transmit or receive data.

Second Embodiment

Figure 7:
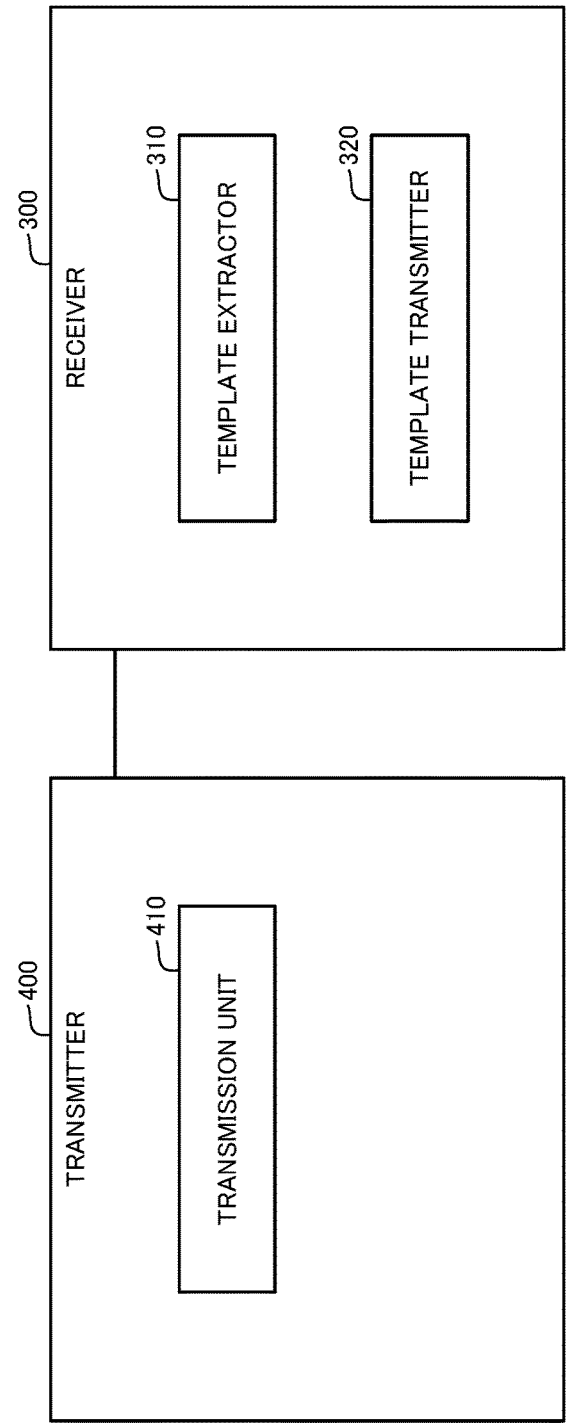
FIG. 7 is a block diagram showing the configuration of a communication system according to a second embodiment of the present invention.

Next, a communication system according to a second embodiment of the present invention will be described with reference to FIG. 7. FIG. 7 is a block diagram showing the configuration of a communication system according to the second embodiment. The communication system of the present embodiment represents an outline of the communication system described in the first embodiment.

The communication system according to the present embodiment includes transmitters 400 and a receiver 300. The receiver 300 includes a template extractor 310 that extracts a template consisting of a common portion and a variable portion of transmission data received from the transmitters 400 on the basis of transmitter identifiers included in the transmission data and the content of the transmission data. The receiver 300 also includes a template transmitter 320 that transmits the extracted template to the transmitters 400. The transmitters 400 each include a transmission unit 410 that compresses the corresponding transmission data using the template and transmits the compressed transmission data to the receiver 300.

According to the above configuration, the receiver 300 first receives transmission data from the transmitters 400 and extracts transmitter identifiers included in the transmission data and the content of the transmission data. The receiver 300 then extracts a template consisting of a common portion and a variable portion of the transmission data on the basis of the transmitter identifiers and the content and stores the template. The receiver 300 then transmits the extracted template to the transmitters 400.

Thus, the transmitters 400 are able to compress the transmission data using the template and to transmit the compressed transmission data to the receiver 300, and the receiver 300 is able to develop the data on the basis of the stored template. Since the template is a template extracted on the basis of the transmitter identifiers and the content of the transmission data and consisting of a common portion and a variable portion, it can be used by any transmitter so that transmission data can be transmitted in a compressed manner. As a result, data can be transmitted and received efficiently in the communication system including the multiple transmitters.

Supplementary Notes

Some or all of the above embodiments can be described as in Supplementary Notes below. The configurations of a communication system, program, receiver, transmitter, program, and communication method according to the present invention are outlined below. However, the present invention is not limited to the configurations below.

Supplementary Note 1

A communication system comprising:
transmitters; and
a receiver, wherein
the receiver comprises:
a template extractor configured to extract a template consisting of a common portion and a variable portion of transmission data received from the transmitters on the basis of transmitter identification information included in the transmission data and content of the transmission data; and
a template transmitter configured to transmit the extracted template to the transmitters, and
the transmitters each comprise a transmission unit configured to compress the transmission data using the template and to transmit the compressed transmission data to the receiver.

Supplementary Note 2

The communication system according to Supplementary Note 1, wherein if the template extractor of the receiver receives transmission data that has not been compressed using a template, from one of the transmitters, the template extractor extracts a template from the received transmission data and transmission data received in the past.

Supplementary Note 3

The communication system according to Supplementary Note 1 or 2, wherein the template transmitter of the receiver selects a transmitter on the basis of the transmitter identification information included in the transmission data from which the template has been extracted and transmits the same template to the selected transmitter.

Supplementary Note 4

The communication system according to Supplementary Note 3, wherein
the template transmitter of the receiver determines whether there is a template similar to the extracted template, and
if the template transmitter determines that there is a similar template, the template transmitter selects a transmitter corresponding to transmitter identification information included in transmission data from which the similar template has been extracted and transmits the same template to the selected transmitter.

Supplementary Note 5

The communication system according to any one of Supplementary Notes 1 to 4, wherein
the template extractor of the receiver stores the extracted template in the receiver, and
the receiver comprises a response unit, wherein when the receiver receives transmission data compressed using a template from one of the transmitters, the response unit determines whether the template used to compress the transmission data is valid, on the basis of the template stored in the receiver, and
if the response unit determines that the template is not valid, the response unit notifies the one transmitter that the template is invalid.

Supplementary Note 6

The communication system according to Supplementary Note 5, wherein if the template used to compress the received transmission data is not stored in the receiver, the response unit notifies the one transmitter that the template is invalid.

Supplementary Note 6.1

The communication system according to Supplementary Note 5 or 6, wherein the response unit of the receiver notifies the one transmitter that the template used to compress the transmission data is invalid and requests the one transmitter to retransmit the transmission data.

Supplementary Note 7

The communication system according to Supplementary Note 5 or 6, wherein
the transmission unit of each of the transmitters stores the template transmitted from the receiver in the transmitter, as well as compresses the transmission data using the stored template and transmits the compressed transmission data to the receiver, and
if the transmission unit of the one transmitter is notified that the template is invalid by the receiver, the transmission unit deletes the stored template and retransmits the transmission data to the receiver without using a template.

Supplementary Note 8

A receiver comprising:
a template extractor configured to extract a template consisting of a common portion and a variable portion of transmission data received from transmitters on the basis of transmitter identification information included in the transmission data and content of the transmission data; and
a template transmitter configured to transmit the extracted template to the transmitters.

Supplementary Note 8.1

The receiver according to Supplementary Note 8, wherein if the template extractor receives transmission data that has not been compressed using a template, from one of the transmitters, the template extractor extracts a template from the received transmission data and transmission data received in the past.

Supplementary Note 8.2

The receiver according to Supplementary Note 8 or 8.1, wherein the template transmitter selects a transmitter on the basis of the transmitter identification information included in the transmission data from which the template has been extracted and transmits the same template to the selected transmitter.

Supplementary Note 8.3

The receiver according to Supplementary Note 8.2, wherein the template transmitter determines whether there is a template similar to the extracted template, and if the template transmitter determines that there is a similar template, the template transmitter selects a transmitter corresponding to transmitter identification information included in transmission data from which the similar template has been extracted and transmits the same template to the selected transmitter.

Supplementary Note 8.4

8. The receiver according to any one of Supplementary Notes 8 to 8.3, wherein the template extractor stores the extracted template in the receiver, the receiver further comprising a response unit, wherein when the receiver receives transmission data compressed using a template from one of the transmitters, the response unit determines whether the template used to compress the transmission data is valid, on the basis of the template stored in the receiver, and if the response unit determines that the template is not valid, the response unit notifies the one transmitter that the template is invalid.

Supplementary Note 8.5

The receiver according to Supplementary Note 8.4, wherein if the template used to compress the received transmission data is not stored in the receiver, the response unit notifies the one transmitter that the template is invalid.

Supplementary Note 8.6

The receiver according to Supplementary Note 8.4 or 8.5, wherein the response unit notifies the one transmitter that the template used to compress the transmission data is invalid and requests the one transmitter to retransmit the transmission data.

Supplementary Note 8.7

A computer-readable storage medium storing a program for causing a receiver to implement:

a template extractor configured to extract a template consisting of a common portion and a variable portion of transmission data received from transmitters on the basis of transmitter identification information included in the transmission data and content of the transmission data; and a template transmitter configured to transmit the extracted template to the transmitters.

Supplementary Note 8.8

The computer-readable storage medium storing the program according to Supplementary Note 8.7, wherein the template extractor stores the extracted template in the receiver, the program causing the receiver to further implement a response unit, wherein when the receiver receives transmission data compressed using a template from one of the transmitters, the response unit determines whether the template used to compress the transmission data is valid, on the basis of the template stored in the receiver, and if the response unit determines that the template is not valid, the response unit notifies the one transmitter that the template is invalid.

Supplementary Note 9

A transmitter comprising a transmission unit configured to compress transmission data using a template extracted and transmitted by a receiver on the basis of transmitter identification information included in the transmission data received from the transmitter and content of the transmission data and consisting of a common portion and a variable portion of the transmission data and to transmit the compressed transmission data to the receiver.

Supplementary Note 9.1

The transmitter according to Supplementary Note 9, wherein the transmission unit stores the template transmitted from the receiver in the transmitter, as well as compresses the transmission data using the stored template and transmits the compressed transmission data to the receiver, and if the transmission unit is notified that the template is invalid by the receiver, the transmission unit deletes the stored template and retransmits the transmission data to the receiver without using a template.

Supplementary Note 9.2

A computer-readable storage medium storing a program for causing a transmitter to implement a transmission unit configured to compress transmission data using a template extracted and transmitted by a receiver on the basis of transmitter identification information included in the transmission data received from the transmitter and content of the transmission data and consisting of a common portion and a variable portion of the transmission data and to transmit the compressed transmission data to the receiver.

Supplementary Note 10

A communication method performed by a communication system including transmitters and a receiver, the communication method comprising:

extracting, by the receiver, a template consisting of a common portion and a variable portion of transmission data received from the transmitters on the basis of transmitter identification information included in the transmission data and content of the transmission data and transmitting the extracted template to the transmitters; and compressing, by the transmitters, the transmission data using the template and transmitting the compressed transmission data to the receiver.

Supplementary Note 11

The communication method according to Supplementary Note 10, wherein if the receiver receives transmission data that has not been compressed using a template, from one of the transmitters, the receiver extracts a template from the received transmission data and transmission data received in the past.

Supplementary Note 12

The communication method according to Supplementary Note 10 or 11, wherein the receiver selects a transmitter on the basis of the transmitter identification information included in the transmission data from which the template has been extracted and transmits the same template to the selected transmitter.

Supplementary Note 13

The communication method according to Supplementary Note 12, wherein the receiver determines whether there is a template similar to the extracted template, and if the receiver determines that there is a similar template, the receiver selects a transmitter corresponding to transmitter identification information included in transmission data from which the similar template has been extracted and transmits the same template to the selected transmitter.

Supplementary Note 14

The communication method according to Supplementary Note 10 or 13, wherein the receiver stores the extracted template in the receiver, when the receiver receives transmission data compressed using a template from one of the transmitters, the receiver determines whether the template used to compress the transmission data is valid, on the basis of the template stored in the receiver, and if the receiver determines that the template is not valid, the receiver notifies the one transmitter that the template is invalid.

Supplementary Note 15

The communication method according to Supplementary Note 14, wherein if the template used to compress the received transmission data is not stored in the receiver, the receiver notifies the one transmitter that the template is invalid.

Supplementary Note 16

The communication method according to Supplementary Note 14 or 15, wherein the receiver notifies the one transmitter that the template used to compress the transmission data is invalid and requests the one transmitter to retransmit the transmission data.

Supplementary Note 17

The communication method according to Supplementary Note 15 or 16, wherein each of the transmitters stores the template transmitted from the receiver in the transmitter, as well as compresses the transmission data using the stored template and transmits the compressed transmission data to the receiver, and if the transmission unit of the one transmitter is notified that the template is invalid by the receiver, the transmission unit deletes the stored template and retransmits the transmission data to the receiver without using a template.

The above programs are stored in a storage device or computer-readable storage medium. For example, the storage medium is a portable medium such as a flexible disk, optical disk, magneto-optical disk, or semiconductor memory.

While the present invention has been described with reference to the embodiments and the like, the present invention is not limited thereto. Various changes understandable by those skilled in the art can be made to the configuration or details of the invention of the present application without departing from the scope of the invention.

DESCRIPTION OF REFERENCE NUMERALS 1, 2 receiver
1a to 1d, 2a, 2b, 1e transmitter
10 receiver
11 data transmitter/receiver
111 format determination unit
112 statistics update unit
113 template retrieval unit
114 response unit
115 template transmitter
12 statistics processor
121 template extractor
122 similar transmitter extractor
13 template manager
14 data storage
20 transmitter
21 data transmitter/receiver
211 template retrieval unit
212 data transmitter
213 retransmitter
214 template receiver
22 template manager
23 data storage
110 receiver
120 transmitter
300 receiver
310 template extractor
320 template transmitter
400 transmitter
410 transmission unit

The invention claimed is:

1. A communication system comprising:
   transmitters; and
   a receiver, wherein
   the receiver comprises:
      a template extractor configured to extract a template consisting of a common portion and a variable portion of transmission data received from the transmitters on the basis of transmitter identification information included in the transmission data and content of the transmission data; and
      a template transmitter configured to transmit the extracted template to the transmitters, and
   the transmitters each comprise a transmission unit configured to compress the transmission data using the template and to transmit the compressed transmission data to the receiver, wherein
   the template extractor of the receiver stores the extracted template in the receiver, and
   the receiver comprises a response unit, wherein when the receiver receives transmission data compressed using a template from one of the transmitters, the response unit determines whether the template used to compress the transmission data is valid, on the basis of the template stored in the receiver, and if the response unit determines that the template is not valid, the response unit notifies the one transmitter that the template is invalid.

2. The communication system according to claim 1, wherein if the template extractor of the receiver receives transmission data that has not been compressed using a template, from one of the transmitters, the template extractor extracts a template from the received transmission data and transmission data received in the past.

3. The communication system according to claim 1, wherein the template transmitter of the receiver selects a transmitter on the basis of the transmitter identification information included in the transmission data from which the template has been extracted and transmits the same template to the selected transmitter.

4. The communication system according to claim 3, wherein
   the template transmitter of the receiver determines whether there is a template similar to the extracted template, and
   if the template transmitter determines that there is a similar template, the template transmitter selects a transmitter corresponding to transmitter identification information included in transmission data from which the similar template has been extracted and transmits the same template to the selected transmitter.

5. The communication system according to claim 1, wherein if the template used to compress the received transmission data is not stored in the receiver, the response unit of the receiver notifies the one transmitter that the template is invalid.

6. The communication system according to claim 1, wherein the response unit of the receiver notifies the one transmitter that the template used to compress the transmission data is invalid and requests the one transmitter to retransmit the transmission data.

7. The communication system according to claim 1, wherein
the transmission unit of each of the transmitters stores the template transmitted from the receiver in the transmitter, as well as compresses the transmission data using the stored template and transmits the compressed transmission data to the receiver, and
if the transmission unit of the one transmitter is notified that the template is invalid by the receiver, the transmission unit deletes the stored template and retransmits the transmission data to the receiver without using a template.

8. A receiver comprising:
a template extractor configured to extract a template consisting of a common portion and a variable portion of transmission data received from transmitters on the basis of transmitter identification information included in the transmission data and content of the transmission data; and
a template transmitter configured to transmit the extracted template to the transmitters,
wherein the template extractor stores the extracted template in the receiver, the receiver further comprising a response unit, wherein when the receiver receives transmission data compressed using a template from one of the transmitters, the response unit determines whether the template used to compress the transmission data is valid, on the basis of the template stored in the receiver, and if the response unit determines that the template is not valid, the response unit notifies the one transmitter that the template is invalid.

9. The receiver according to claim 8, wherein if the template extractor receives transmission data that has not been compressed using a template, from one of the transmitters, the template extractor extracts a template from the received transmission data and transmission data received in the past.

10. The receiver according to claim 8, wherein the template transmitter selects a transmitter on the basis of the transmitter identification information included in the transmission data from which the template has been extracted and transmits the same template to the selected transmitter.

11. A communication method performed by a communication system including transmitters and a receiver, the communication method comprising:
extracting, by the receiver, a template consisting of a common portion and a variable portion of transmission data received from the transmitters on the basis of transmitter identification information included in the transmission data and content of the transmission data and transmitting the extracted template to the transmitters; and
compressing, by the transmitters, the transmission data using the template and transmitting the compressed transmission data to the receiver, wherein
the receiver stores the extracted template in the receiver,
when the receiver receives transmission data compressed using a template from one of the transmitters, the receiver determines whether the template used to compress the transmission data is valid, on the basis of the template stored in the receiver, and
if the receiver determines that the template is not valid, the receiver notifies the one transmitter that the template is invalid.

12. The communication method according to claim 11, wherein if the receiver receives transmission data that has not been compressed using a template, from one of the transmitters, the receiver extracts a template from the received transmission data and transmission data received in the past.

13. The communication method according to claim 11, wherein the receiver selects a transmitter on the basis of the transmitter identification information included in the transmission data from which the template has been extracted and transmits the same template to the selected transmitter.

14. The communication method according to claim 13, wherein
the receiver determines whether there is a template similar to the extracted template, and
if the receiver determines that there is a similar template, the receiver selects a transmitter corresponding to transmitter identification information included in transmission data from which the similar template has been extracted and transmits the same template to the selected transmitter.

15. The communication method according to claim 11, wherein if the template used to compress the received transmission data is not stored in the receiver, the receiver notifies the one transmitter that the template is invalid.

16. The communication method according to claim 11, wherein the receiver notifies the one transmitter that the template used to compress the transmission data is invalid and requests the one transmitter to retransmit the transmission data.

17. The communication method according to claim 15, wherein
each of the transmitters stores the template transmitted from the receiver in the transmitter, as well as compresses the transmission data using the stored template and transmits the compressed transmission data to the receiver, and
if the transmission unit of the one transmitter is notified that the template is invalid by the receiver, the transmission unit deletes the stored template and retransmits the transmission data to the receiver without using a template.

* * * * *